United States Patent Office 3,577,546
Patented May 4, 1971

3,577,546
USE OF POLYCHLORO KETO-ALKENOIC ACIDS AND DERIVATIVES THEREOF AS INSECTICIDES
William A. Erby, Alburtis, and Robert A. Walde, Emmaus, Pa., assignors to Air Products and Chemicals, Inc., Allentown, Pa.
No Drawing. Filed Apr. 8, 1966, Ser. No. 541,096
Int. Cl. A01n *9/28*
U.S. Cl. 424—279                    7 Claims

ABSTRACT OF THE DISCLOSURE

A method for killing insects which comprises contacting the insects with an insecticidally effective amount of a polychloro keto-alkenoic acid or derivative thereof.

---

The present invention is concerned with novel methods for the synthesis of polyhalogenated and perhalogenated keto alkenoic acids, particularly such monocarboxy acids having 4 to 10 carbon atoms from the corresponding saturated keto acids, their esters, amides, anhydrides, lactones, acyl halides, and other acidogenic derivatives. Certain of the compounds produced in accordance with the invention have been found to have desirable biological properties and the invention includes compositions and methods utilizing these properties.

In the disclosure which follows the term "poly chlorinated" refers to compounds containing at least four chlorine atoms per molecule and "perchlorinated" refers to compounds in which all of the hydrogen atoms attached to carbon atoms in the molecule are substituted by chlorine.

The halogenated compounds produced by the novel method of the present invention from 4 carbon keto carboxy acids correspond in form to the carboxylic acids of the empirical formula $$C_4OCl_{5-x}H_xCOOR$$

wherein $x$ is 0 or 1, and R is H or the residue of an esterifying organic hydroxy compound such as an alcohol or phenol.

Compounds corresponding to the above formula are produced in high yields and exceptional purity in accordance with the invention by direct chlorination of levulinic acid or its acidogenic derivatives under controlled conditions of time and temperature to obtain an olefinic linkage at the carbon in the position alpha to the carboxy group. Illustrative of the compounds thus obtained and certain derivative esters are:

(1) 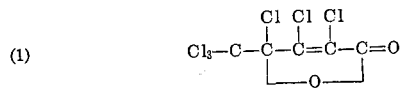

2,3,4,5,5,5-hexachloro-2 pentenoyl-4-lactone (perchloro angelica lactone)

(2) 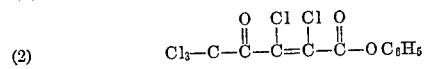

phenyl-2,3,5,5,5-pentachloro-4-keto-2-pentenoic acid ester (3) 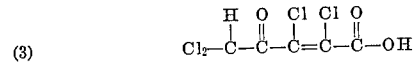

2,3,5,5-tetrachloro-4-keto-2-pehtenoic acid (4) 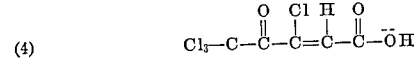

3,5,5,5-tetrachloro-4-keto-2-pentenoic acid (5) 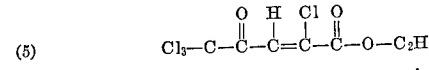

ethyl 2,5,5,5-tetrachloro-4-keto-2-pentenoic acid ester

The polychloro-compounds so produced have been found to have pronounced activity as insecticides, herbicides and cotton defoliants, such that, in a process based upon low cost levulinic acid and chlorine, commercially valuable biocidal chemicals can be produced at low cost.

Esterification of the free acid can be effected with monohydric or polyhydric alcohol. Thus, by reacting compound (1) with pentaerythritol a mixture comprising mono- and diesters is obtained.

While various investigators have reported the chlorination of levulinic acid to the mono- or dichloro-stage, there is no report to date of any direct chlorination and dehydrogenation of levulinic acid or its acidogenic derivatives to the unsaturated polychloro- or perchloro-stage.

Early attempts to chlorinate levulinic acid directly resulted only in the production of mono- and dichloro-derivatives. [Seissl, Annallen, 249, 288–303 (1888)]. A number of polychloropentenoyl ketones, acids, acid halides and anhydrides have since been prepared by methods other than by direct chlorination of levulinic acid. [Zincke, Berichte der Deutsche Chemische Gesellschaft, 23, 240 (1890); 24, 916 (1891); 25, 2221 (1892); 26, 506 (1893); 26, 317].

From the methods heretofore described, therefore, it was wholly unexpected that direct chlorination of 4 to 10 carbon saturated keto carboxylates, such as levulinic acid and its acidogenic derivatives, would lead to the production of unsaturated tetrachloro-pentachloro and hexachloro derivatives respectively. In fact, such unsaturated halogen derivatives are obtained in desired yield and purity only in accordance with the present invention by careful control of halogenation conditions as hereinafter described.

The desired compounds are produced, in accordance with the invention, for example, by passing chlorine into levulinic acid or into an acidogenic derivative of levulinic acid over an extended period of time while raising the temperature gradually from ambient temperature to a temperature in the region of 170 to 250° C. There are thus obtained in high yield and good purity, polychloro and perchloro keto-pentenoic acids and their derivatives having four or more chlorine atoms per molecule. The obtained acids can be readily converted to the corresponding salts, esters and amides by methods generally known in the art.

The distinct properties of the compounds obtained by the practice of the invention which render these useful as effective insecticidal and herbicidal compositions, are believed to reside in the simultaneous presence in the carboxylic compound of the polychloro function combined with the effect of olefinic linkage, and the keto type structure. Despite the high insecticidal activity displayed by these compounds they are highly selective in their action on plants, whereby they also have utility as plant growth control and defoliating agents.

The following examples illustrate the invention and are not intended to limit the same.

EXAMPLE I

Chlorine gas was passed continuously through 588 g. of ethyl levulinate with rapid mixing. The temperature rose exothermally to 60° C. and remained there for 26 hours. When the temperature started to fall heat was applied to raise the temperature to 112° C. The temperature of the reaction was then allowed to rise slowly with further chlorination to 180° C. and kept there for 35 hours. More heat was applied and the temperature was further increased to 212° C. and held at that temperature for 14 hours. The total reaction time was 75 hours. At the end of this period the chlorine content of the product was 70.5% and 1435 grams of material were recovered. Gas chromatographic, infra-red spectrographic, ultimate analysis and other physical tests showed the sample to consist 93% of the 2,3,4,5,5,5-hexachloro-2-pentenoyl-4-lactons. (perchloro-angelica lactone):

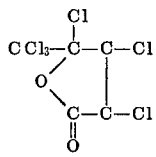

Boiling point—74.5° C./0.2 mm. Hg
Refractive index, 20°/D—1.5465
Density, g./ml. at 20° C.—1.6357

|  | Found | Theory |
| --- | --- | --- |
| Chlorine content, percent | 70.2 | 69.8 |
| Carbon content, percent | 20.2 | 19.8 |
| Molecular weight | 315 | 305 |

Strong characterizing adsorption peaks for infra-red were at 1835 cm.⁻¹ and 974 cm.⁻¹. Weight recovery on the basis of this structure was 94% of theoretical.

Halogenated angelica lactone behaves in its chemical reactions as if it were an open acyl halide of the type

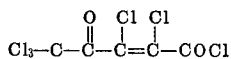

Thus it can be readily esterified by reaction with sodium phenoxide obtaining the phenyl ester of pentachloro-4-keto-2-pentenoic acid.

EXAMPLE II 11.6 lb. of levulinic acid were placed in a vessel with a sintered glass bottom which allowed rapid and uniform dispersion of gases through the contents. Chlorine was passed rapidly into this system with the initial temperature maintained below 90° C. by external cooling. After 24 hours of chlorination, hydrogen chloride evolution decreased noticeably. The temperature was then raised to 125° C. for 24 hours while maintaining an excess of chlorine in the reaction system (as evidenced by the presence of free chlorine in the exit gas and yellow color in the reactor solution). The temperature was then slowly increased to 170° C. and maintained at that temperature over 8 hours with continuous chlorine addition until HCl evolution again diminished. The reaction product crystallized on cooling. A sample, after recrystallization, was a white solid having a melting point of 117–118° C. While the reaction product might be expected to be a broad mixture of trichloro- to hexachloro-compound with numerous stereo-isomers, the product was, surprisingly predominantly the unsaturated tetrachloro-keto-acid with very little trichloro-or pentachloro-acid present.

EXAMPLE III

Using essentially the same equipment as in Example II, levulinic acid was chlorinated directly by the introduction of chlorine with the initial reaction temperature held at 60 to 90° C. until about one-third of the total chlorine was introduced and reacted. After the initial one-third had reacted, the reaction temperature was increased slowly by the exothermic heat of chlorination to the vicinity of 170° C. and by supplementary heating to 190° to 200° C. while maintaining a substantial excess of chlorine. The reaction mixture was held in the temperature range of 190 to 200° C. until there was a substantial drop in the rate of chlorine absorption and HCl release. At this point, a sample withdrawn from the reactor and washed with n.heptane gave a white crystalline product found, on ultimate analysis, to be principally C₅Cl₅HO₃.

|  | Theoretical | Found |
| --- | --- | --- |
| Carbon, percent | 20.98 | 21.25 |
| Hydrogen, percent | 0.35 | 0.38 |
| Chlorine, percent | 61.92 | 61.17 |
| Molecular weight | 286 | 275 |
| Melting Point ° C | | 83–85 |
| Neutralization equivalent | 286 | 278 |

Infra-red analysis showed the following characteristic peaks:

| | |
| --- | --- |
| $-\overset{O}{\overset{\|}{C}}-$ | 1785 cm⁻¹ |
| —C=C—(conj.) | 1625 cm⁻¹ |
| $-\overset{O}{\overset{\|}{C}}-OH$ | 1815 cm⁻¹ |
| —OH | 3375 cm⁻¹ |
| —Cl | 740 cm⁻¹ | from which the structural formula was indicated to be

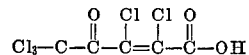

2,3,5,5,5-pentachloro-4-keto-2-pentenoic acid. Cis-configuration of this structure was confirmed by production of the same unsaturated polychloro-compound on acid hydrolysis of the related hexachloro-angelica-lactone of Example I.

EXAMPLE IV

To further point up the criticality of temperature in direct chlorination by the present process, the reaction product of Example III, principally the pentachloro-4-keto-pentenoic acid, was then heated from 200° C. to about 260° C. with the continuous addition of chlorine. After 24 hours at 250 to 260° C. the reaction product was practically completely converted to the liquid unsaturated hexachloro-lactone of Example I.

Whereas direct chlorination of levulinic acid would generally be expected to form the simple chloro-derivatives of the acid, this has been shown to proceed only to the dichloro-stage. However, on extended chlorination at the 170 to 260° C. level with an excess of chlorine, we have found surprisingly that four or more hydrogen atoms are substituted by chlorine atoms and two hydrogen atoms are simultaneously split off (as HCl) to produce a new species of olefinically unsaturated derivatives. The point at which dehydrogenation takes place in the process of chlorination is not clear, however, the products of chlorination according to the invention are fully olefinically unsaturated at the tetra-, penta- and hexachloro level. Unless temperature is carefully controlled, particularly during the early stages of halogenation, one obtains only polymeric products of a tarry nature.

The process of producing unsaturated polychloro-4-keto-pentenoic acid or its acidogenic derivatives with at least four chlorine atoms per molecule has been exemplified above starting with levulinic acid or its ester. However, the process is not limited to these starting materials alone. Acyl halides and anhydrides of levulinic acid, can be used and since chlorination of levulinic acid and its acidogenic derivatives to monochloro and dichloro- state has been effected heretofore, such intermediately chlorinated derivatives can be used as well, whether chlorine is in the alkyl chain, in the acyl group, or in both. Homologous keto acids and keto acids relatable to levulinic acid and angelica lactone such as acetoacetic acid, mesitonic acid (2,2-dimethyl levulinic acid) gamma-acetobutyric acid and homologues of such acids are similarly polychlorinatable or perchlorinatable according to the invention.

While the invention is principally concerned with chlorination, it will be understood that other halogenation reactions, such as bromination, can also be effected by stepwise temperature elevation during halogenation to obtain corresponding unsaturated keto acids having 4 or more bromine substituents.

Definite temperature limits have been shown for each chlorination step, however, it will be appreciated by those conversant with the art that reasonable variations can be made in the prescribed temperature and time of chlorination by which the rate and extent of chlorination and dehydrogenation can be varied in any step of the process. Thus, whereas chlorination and dehydrogenation of ethyl levulinate was effected over periods as long as 72 hours with rising temperature and with a significant quotient of reaction time at or above 210° C., a similar degree of chlorination and dehydrogenation might be effected in somewhat shorter time though probably less selectively at moderately higher temperatures.

A very substantial number of chlorinated acids and keto acids have been reported heretofore as having insecticidal and herbicidal properties. In fact, the range of such compounds showing herbicidal activity in some degree is so broad that any new compound proposed for such use can be evaluated only by specific test procedures. The unsaturated polychloro- and perchloro-compounds produced by the present invention were found surprisingly effective when evaluated relative to currently accepted insecticides and herbicides. For example, as an insecticide, high activity was shown by the perchloro-pentenoyl-lactone (PCL) and the phenyl ester (φPCA) of the pentachloro-unsaturated acid against nematodes, beetles, drosophila (fruit fly) and mites.

BIOCIDAL TESTS

A; at 2,500 p.p.m.

| Species | Reference standard, Chlordane | PCL | φPCA |
|---|---|---|---|
| Confused flour beetle: Mortality, percent kill/24 hours. | 40/24 hr | | 30/hr. |

B; at 1,000 p.p.m.

| | | | |
|---|---|---|---|
| Drosophila: | | | |
| Knockdown | | | 100%/1 hr. |
| Mortality | 100%/24 hr | 100%/24 hr | 100%/24 hr. |

| | Kelthane | | |
|---|---|---|---|
| Mites, mortality | 100%/24 hr | 93%/24 hr | |

C; at 500 p.p.m. Nemagon

| | | | |
|---|---|---|---|
| Nematodes, mortality | 100% | 100% | |

Both the perchloro-unsaturated lactone and its phenol ester were at least equally effective against specimen insects as a current commercial material.

The biocidal activity of the polyhalogenated unsaturated keto acid compounds is illustrated in the following tests as fungicides and bactericides.

(A) FUNGICIDAL TEST

Into culture plates was placed a corn meal nutrient media which contained pentachloro-4-ketopentenoic acid in various concentrations. The media was then innoculated with a fungus (Aspergillus) and placed in an incubator at 32° C. for one week. At the end of this time, the growth in each plate was evaluated. The data is listed below.

Concentration of PCA percent by wt.: Growth
0.5 ................................ No growth.
0.25 ............................... No growth.
0.12 ............................... No growth.
0.06 ............................... No growth.
0.03 ............................... Heavy growth.
0.015 .............................. Heavy growth.
0 .................................. Heavy growth.

(B) BACTERICIDAL TEST

Liquid antiseptics applied for short time periods, that is, for use on cuts, scratches, and minor wounds, for gargles, etc., are tested by a method known as the "F.D.A. Method (Special) *Escherichia coli*, 37° C." This method tests for quick and positive germicidal activity. According to the U.S. Department of Agriculture, Food and Drug Administration, "the information desired is the concentration which will kill in five minutes."

TEST ORGANISM

*Escherichia coli*

Medium—5 grams; peptone (Armour), 10 grams; sodium chloride, c.p., 5 grams; distilled water, 1000 ml. Boil for 30 minutes to dissolve; adjust to pH 6.8 with normal sodium hydroxide or saturated aqueous sodium carbonate; boil 10 minutes; filter through paper; and make up to original volume. Pour 10 ml. into unlipped test tubes, 19 x 150 mm., plug with cotton, and sterilize in the autoclave at 15 lb. pressure for 30 minutes. Nutrient agar for stock cultures is made by adding 1.5% Bacto-Agar (Difco) to this broth base, adjusted to pH 7.4.

STOCK CULTURE

The stock culture is transferred to agar slants of the above composition each four months and stored at 10° F.

TEST CULTURE

The test culture is prepared by transferring from an agar slant stock culture into 10 ml. of the above broth medium and incubating at 37° C. for three consecutive days. This culture, on being tested, must resist 1:80 phenol (1 part phenol to 80 parts water) for 5 minutes and 1:90 phenol for 15 minutes at 37° C.

MEDICATION TUBE

Unlipped test tubes, 25 x 150 mm. plugged with cotton and sterilized in steam, 250° F. at 15 p.s.i., for 20 minutes, are used for mixing the culture with the antiseptic in the test.

TEMPERATURE OF TEST

The antiseptic and test culture must be warmed in a water bath to 37° C. and held at this temperature during the period of the test.

PROPORTION OF CULTURE TO ANTISEPTIC

A uniform suspension of the culture is obtained by vigorous shaking, without wetting the cotton plug, and placed into the water bath 5 minutes before starting the test. In conducting the test (see below), a 1-ml. pipet is inserted to the middle of the culture, and 0.5 ml. is removed and added to 5 ml. of antiseptic, mixed thoroughly with slight agitation, and replaced in the water bath at 37° C.

INOCULATION LOOP

A 4-mm. loop of platinum wire, U.S. No. 23 B. and S. gage, 1½ to 3 inches long, set in a suitable holder such as aluminum or glass rod 0.5 cm. in diameter, is used to transfer from the antiseptic-culture mixture to 100 x 10 mm. petri dishes, filled with 10 ml. Mac Conkey Agar.

INCUBATION

The cultures are incubated at 37° for 24 hours.

DILUTIONS

Any series of dilutions that may be required are made in sterile distilled water or the antiseptic may be tested undiluted. A 1% and 0.1% dilution is used.

METHOD FOR CONDUCTING TEST

Put 5 ml. of the antiseptic, undiluted or diluted as desired, into sterile test tubes, 25 x 150 mm., and warm to 37° C. in a water bath. Allow the 24-hour broth culture of the test organism, after vigorous shaking, to warm in the same water bath for 5 minutes. Remove 0.5 mol. of this culture with a 1-ml. graduated pipet, as described above, add to the 5 ml. of antiseptic, and mix by slight agitation.

Transfer from the mixture of the culture and antiseptic to a sterile Petri dish prepared with Difco Mac Conkey Agar by means of a sterile 4 mm. loop at intervals of 5 minutes, 10 minutes, and 15 minutes.

After incubation at 37° C. for 24 hours observe the streaks in each dish at each time interval for visible growth. If the test organism has not been killed, the streak will appear as a red felt mass on top of the agar; if they have been killed, the streaks will remain clear. The results are recorded as + or 0, meaning growth or no growth respectively.

INTERPRETATION OF RESULTS

The information desired is the concentration of the antiseptic required to kil S. aureus under the conditions of the test within 5 minutes. If a preparation does not pass this test within this time period, it is considered inert as an antiseptic, or at least is not sufficiently germicidal to be classified as an antiseptic. On the other hand, the results can properly be interpreted indirectly in terms of practical value by comparison with results obtained with other liquid germicides of known merit. A Phenol dilution in water is used to check against test material for killing power.

Results of test on PCL and PCA at 1% and 0.1% dilution:

|  | Resistance at 37° C. | | | | | |
|---|---|---|---|---|---|---|
|  | 1% dilution, min. | | | 0.1% silution, min. | | |
|  | 5 | 10 | 15 | 5 | 10 | 15 |
| Phenol | 0 | 0 | 0 | 0 | + | + |
| PCL | 0 | 0 | 0 | 0 | 0 | 0 |
| PCA | 0 | 0 | 0 | 0 | 0 | 0 |

NOTE: 0=No growth; +=Growth of organism.

These compounds also showed unusual herbicidal action in inhibiting the germination of wheat, flax, tomato and radish seed:

PHYTOCIDAL TESTS
[At 2,500 p.p.m.]

|  | Percent germination | | |
|---|---|---|---|
|  | Reference standard Karmax | PCL | PCA |
| Seed specimen: | | | |
| Wheat | 98 | 4 | 4 |
| Flax | 96 | 0 | 0 |
| Radish | 100 | 0 | 0 |
| Tomato | 88 | 0 | 0 |

The compared commercial compounds were the following:

Kelthane is di-p-chlorophenyl-trichloromethyl carbinol
Chlordane is 1,2,4,5,6,7,8,8A-octachloro-4,7-methano-3A, 4,7,7A-tetrahydro-indane (Velsicol-1C)
Nemagon is 1,2-dibromo-3-chloro-propane
Karmax (Diuron) is N-dimethyl-N'-dichlorophenyl-urea.

The pentachloro-4-keto-pentenoic acid has thus been shown to be more effective in general than the reference commercial herbicide and outstandingly more effective in retarding the growth of cucumber, red kidney bean, corn and cotton. The pentachloro-4-keto-pentenoic acid also showed unexpected (90%) ability to defoliate cotton.

The unsaturated tetrachloro-4-keto-acid (TCA), though notably less effective than the pentachloro-compound in retarding the growth of beets, radish and cotton, was at least equal to our superior to the reference commercial herbicide against tomato, cucumber, red kidney beans, corn and cotton. It also produced moderate (40%) yet unexpected defoliation of cotton.

The tetra- and pentachloro - 4 - keto - pentenoic acids showed notable activity as pesticides:

|  | Percent mortality | | |
|---|---|---|---|
| Species | PCA | TCA | Sevin* |
| Pomace fly at— | | | |
| 250 p.p.m. of reagent | 53 | 26 | |
| 125 p.p.m | 25 | 22 | 0 |
| 62.5 p.p.m | 0 | 0 | 0 |
| House fly at— | | | |
| 25 gamma/fly, percent kill in 24 hrs | 100 | 65 | 80 |
| 12.5 gamma/fly | 65 | 35 | 40 |

*Sevin: methyl carbamate of alpha naphthol.

On the basis of these tests, PCL, the unsaturated perchloro-lactone of the invention, was notably more effective as an insecticidal and herbicidal compound than reference chlorinated compounds in current commercial use.

The phenolic ester of the pentachloro-unsaturated acid was at least as effective an insecticide as the reference commercial material and, surprisingly, had no herbicidal effect on such valuable plant species as beet, tomato, radish, cucumber, soy bean, red kidney bean, oats, wheat and corn. Chlordans, in corresponding tests showed very high (80 to 100%) toxicity to such plants as beet, radish, tomato and substantial (30 to 50% toxicity to red kidney beans, cucumbers and wheat.

Representative unsaturated tetra- and pentachloro-4-keto-pentenoic acids have been similarly subjected to tests as post-emergence herbicides:

HERBICIDAL TESTS.—POST EMERGENCY HERBICIDE EVALUATION
[Scale: 0=no effect to 10=complete kill of the plant]

|  | PCA | TCA | K |
|---|---|---|---|
| Species: | | | |
| Beet | 10 | 5 | 10 |
| Tomato | 9 | 8 | 8 |
| Radish | 8 | 3 | 9 |
| Cucumber | 10 | 10 | 3 |
| Red kidney beans | 10 | 8 | 4 |
| Cotton | 9 | 4 | 1 |
| Corn | 9 | 8 | 1 |
| Percent cotton defoliation | 90 | 40 | 1 |

NOTE: PCA=Penta-chloro-4-keto-pentenoic-acid; TCA=Tetrachloro-4-keto-pentenoic acid; K=Karmax, reference herbicide.

The combination of herbicidal and insecticidal properties in one compound is valuable for broad scale use of the compound. However, high biocidal selectivity, that is, the ability of a compound to kill insects on the plant yet not harm or inhibit the growth of the plant host is of prime commercial importance. The unusual selectivity of the phenolic ester of pentachloro-4-keto-pentenoic acid is probably due to the specific combination of constitutional characteristic in the compound including (1) the pentachloro component, (2) the conjugated olefinic-carbonyl component, (3) the 4-keto-component and (4) the phenolic ester component.

The process of the invention and the use of the products have been explained and exemplified in a manner so that they can be readily practiced by those skilled in the art; such exemplification including what is considered to represent the best embodiments of the invention. However, it should be clearly understood that, within the scope of the appended claims, the invention may be practiced by those skilled in the art and, having had the benefit of this disclosure, otherwise than as specifically described and exemplified here.

What we claim is:

1. A method for killing insects which comprises contacting insects with an insecticidally amount effective of a compound selected from the group consisting of 2,3,4,5, 5,5-hexachloro-2-pentenoyl-4-lactone; phenyl ester of 2,3,5,5,5-pentachloro-4-keto-2-pentenoic acid, 2,3,5,5,5-tetrachloro-4-keto-pentenoic acid, 3,5,5,5-tetrachloro-4-keto-2-pentenoic acid, 2,3,5,5,5 - pentachloro-4-keto-2-pentenoic aicd and ethyl ester of 2,5,5,5-tetrachloro-4-keto-2-pentenoic acid.

2. The method of claim 1 wherein the compound is 2,3,4,5,5,5-hexachloro-2pentenoyl-4-lactone.

3. The method of claim 1 wherein the compound is 2,3,5,5-tetrachloro-4-keto-2-pentenoic acid.

4. The method of claim 1 wherein the compound is 2,3,5,5,5-pentachloro-4-keto-2-pentenoic acid.

5. The method of claim 1 wherein the compound is the ethyl ester of 2,5,5,5-tetrachloro-4-keto-2-pentenoic acid.

6. The method of claim 1 wherein the compound is the phenyl ester of 2,3,5,5,5-pentachloro-4-keto-2-pentenoic acid.

7. The method of claim 1 wherein the compound is 3,5,5,5-tetrachloro-4-keto-2-pentenoic acid.

References Cited

Zincke, Von Th. & Fuchs, O., "Berichte der Deut. Chem. Gess.," vol. 26, pp. 498–512, (1893).

ALBERT T. MEYERS, Primary Examiner

D. J. FUNDERBURK, Assistant Examiner

U.S. Cl. X.R.

424—314, 317